United States Patent
Pei et al.

(10) Patent No.: US 10,594,665 B2
(45) Date of Patent: Mar. 17, 2020

(54) SECURE TRANSMISSION OF DIGITAL CONTENT OVER A COMPUTER NETWORK

(71) Applicant: Microsoft Technology Licensing, LLC, Redmond, WA (US)

(72) Inventors: Lihong Pei, San Jose, CA (US); Jianchao Lu, Sunnyvale, CA (US); Yingfeng Oh, Cupertino, CA (US); Hardik Bati, Santa Clara, CA (US); Sanjay Sachdev, San Jose, CA (US); Divye R. Khilnani, Sunnyvale, CA (US); Mark Dietz, Sunnyvale, CA (US); Christopher Harris, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 225 days.

(21) Appl. No.: 15/721,813

(22) Filed: Sep. 30, 2017

(65) Prior Publication Data

US 2019/0104113 A1    Apr. 4, 2019

(51) Int. Cl.
| | |
|---|---|
| *H04L 29/06* | (2006.01) |
| *H04L 9/32* | (2006.01) |
| *G06F 16/27* | (2019.01) |
| *H04L 9/08* | (2006.01) |

(52) U.S. Cl.
CPC .......... *H04L 63/0428* (2013.01); *G06F 16/27* (2019.01); *H04L 9/0894* (2013.01); *H04L 9/321* (2013.01); *H04L 63/10* (2013.01); *H04L 63/20* (2013.01); *H04L 2209/60* (2013.01)

(58) Field of Classification Search
CPC ... H04L 63/0428; H04L 9/0894; H04L 63/10; H04L 63/20; H04L 9/321; H04L 2209/60; G06F 16/27
See application file for complete search history.

(56) References Cited

U.S. PATENT DOCUMENTS

| | | | | |
|---|---|---|---|---|
| 6,112,209 A | * | 8/2000 | Gusack | G06F 16/284 |
| 2007/0271355 A1 | * | 11/2007 | Creemer | G06Q 30/0226 709/219 |
| 2008/0276194 A1 | * | 11/2008 | Dykstra-Erickson | G06F 17/243 715/780 |
| 2014/0180711 A1 | * | 6/2014 | Kamen | G06Q 10/06 705/2 |
| 2017/0315979 A1 | * | 11/2017 | Boucher | G06F 3/04847 |

* cited by examiner

*Primary Examiner* — Mahfuzur Rahman
(74) *Attorney, Agent, or Firm* — Hickman Palermo Becker Bingham LLP; Daniel D. Ledesma

(57) ABSTRACT

Techniques are provided for securely obtaining trusted information in an online environment. A first entity stores trusted information from a third entity. A second entity retrieves the trusted information from the first entity. In response to a request from a computing device of the third entity, the first entity identifies a set of attributes selected by the second entity. The first entity identifies, from a profile of the third entity, a set of values that correspond to the set of attributes. The first entity may immediately transmit the set of values to the second entity or may first cause the set of values to be presented to the third entity, for example, in an electronic form. The form may allow some of the values to be editable by the third entity and may prevent other of the values to be edited.

20 Claims, 11 Drawing Sheets

Phone number
4082001200

Work email
lpei@linkedin.com

First name
Lihong

Last name
Pei

Function
Engineering

Seniority
Entry

Company name
LinkedIn

☑ We'll send this information to Google Analytics Solutions, subject to their privacy policy Submit

*FIG. 2F*

SECURE TRANSMISSION OF DIGITAL CONTENT OVER A COMPUTER NETWORK

TECHNICAL FIELD

The present disclosure relates generally to digital content transmission and storage and, more particularly to securely obtaining trusted digital content over a computer network. SUGGESTED ART UNIT: 2144; SUGGESTED CLASSIFICATION: 715/226.

BACKGROUND

Obtaining trustworthy information from online sources has been a problem since the early days of the Internet. Information about individuals in particular is suspect because some individuals have bad motives, including individuals who impersonate other real or imaginary individuals. For example, an individual may enter, into an online electronic form, information about the individual or another that is completely fabricated. Not only is it difficult for online entities to obtain trustworthy information, doing so in a secure manner is difficult to ensure. For example, an individual might enter, into a text field, code that, when executed, causes an online entity's server to perform an illegal operation or to fail. Improvements in obtaining trustworthy and secure information over a computer network are needed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIGS. 2C-2F are screenshots of an example electronic form with editable and non-editable fields, in an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A method and system are provided for securely obtaining digital information in an online environment. In one technique, three parties are involved in trusted information exchange: a first party that includes a data repository or platform that stores trusted information; a second party that is interested in the trusted information; and a third party that is willing to share his/her trusted information. In a related technique, a selection by the third party of a content item (from the second party) that is displayed by the first party causes an electronic form to be automatically filled with data previously provided from the third party and displayed to the third party. In a related technique, multiple second parties provide their respective input to generate customized electronic forms for obtaining trusted information from the first party.

System Overview

Figure 1:
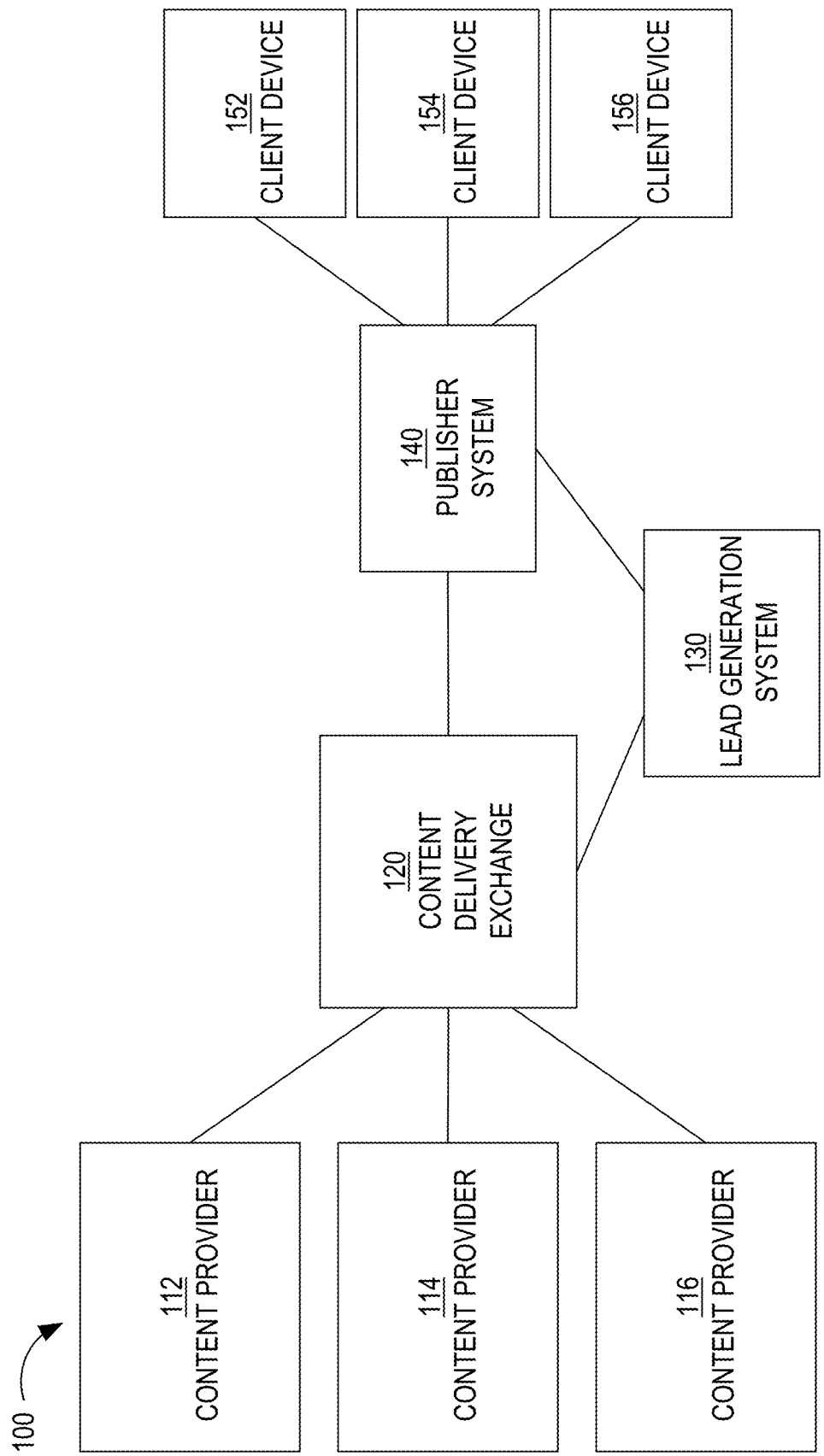
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery exchange 120, a lead generation system 130, a publisher system 140, and client devices 152-156. Although three content providers are depicted, system 100 may include more or less content providers. Similarly, system 100 may include more than one publisher system (i.e., from other publishers) and more or fewer client devices.

Content providers 112-116 interact with content delivery exchange 120 (e.g., over a network, such as a LAN, WAN, or the Internet) to enable content items to be presented, through publisher system 140, to end-users operating client devices 152-156. Thus, content providers 112-116 provide content items to content delivery exchange 120, which in turn selects content items to provide to publisher system 140 for presentation to users of client devices 152-156. However, at the time that content provider 112 registers with content delivery exchange 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery exchange 120.

Although depicted in a single element, content delivery exchange 120 may comprise multiple computing elements and devices, connected in a local network or distributed regionally or globally across many networks, such as the Internet. Thus, content delivery exchange 120 may comprise multiple computing elements, including file servers and database systems.

Publisher system 140 provides its own content to client devices 152-156 in response to requests initiated by users of client devices 152-156. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 140 (and/or its affiliates). A content request may be a request that is immediately preceded by user input (e.g., selecting a hyperlink on web page) or may initiated as part of a subscription, such as through a Rich Site Summary (RSS) feed. In response to a request for content from a client device, publisher system 140 provides the requested content (e.g., a web page) to the client device.

Simultaneously or immediately before or after the requested content is sent to a client device, a content request is sent to content delivery exchange 120. That request is sent (over a network, such as a LAN, WAN, or the Internet) by publisher system 140 or by the client device that requested the original content from publisher system 140. For example, a web page that the client device renders includes one or more calls (or HTTP requests) to content delivery exchange 120 for one or more content items. In response, content delivery exchange 120 provides (over a network, such as a LAN, WAN, or the Internet) one or more particular content items to the client device directly or through publisher system 140. In this way, the one or more particular content items may be presented (e.g., displayed) concurrently with the content requested by the client device from publisher system 140.

In response to receiving a content request, content delivery exchange 120 initiates a content item selection event that involves selecting one or more content items (from among multiple content items) to present to the client device that initiated the content request. An example of a content item selection event is an auction.

Content delivery exchange 120 and publisher system 140 may be owned and operated by the same entity or party. Alternatively, content delivery exchange 120 and publisher system 140 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 152-156 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 120, and that bids for space (on one or more publishers, such as publisher system 140) to present content items on behalf of multiple content providers. Thus, a bidder is another source of content items that content delivery exchange 120 may select for presentation through publisher system 140. Thus, a bidder acts as a content provider to content delivery exchange 120 or publisher system 140. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery exchange 120. A content delivery campaign includes (or is associated with) one or more content items. Thus, the same content item may be presented to users of client devices 152-156. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view the set of content items, select or click on the set of content items, or when a certain number of users purchase a product/service associated with the content delivery campaign or fill out a particular form on a website.

A content delivery campaign may specify one or more targeting criteria that are used to determine whether to present a content item of the content delivery campaign to one or more users. Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 120 receives, from a computing device, a request that does not satisfy the targeting criteria, then content delivery exchange 120 ensures that any content items associated with the particular content delivery campaign are not sent to the computing device.

Thus, content delivery exchange 120 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 120 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 140 may not satisfy targeting criteria of one content item of a campaign, the same content request may satisfy targeting criteria of another content item of the campaign.

Different content delivery campaigns that content delivery exchange 120 manages may have different charge models. For example, content delivery exchange 120 may charge a content provider of one content delivery campaign for each presentation of a content item from the content delivery campaign (referred to herein as cost per impression or CPM). Content delivery exchange 120 may charge a content provider of another content delivery campaign for each time a user interacts with a content item from the content delivery campaign, such as selecting or clicking on the content item (referred to herein as cost per click or CPC). Content delivery exchange 120 may charge a content provider of another content delivery campaign for each time a user performs a particular action, such as purchasing a product or service, downloading a software application, or filling out a form (referred to herein as cost per action or CPA). Content delivery exchange 120 may manage only campaigns that are of the same type of charging model or may manage campaigns that are of any combination of the three types of charging models.

A content delivery campaign may be associated with a resource budget that indicates how much the corresponding content provider is willing to be charged by content delivery exchange 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 120 receives triggers a content item selection event.

For example, in response to receiving a content request, content delivery exchange 120 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 120 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery exchange 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 120 conducts one or more content item selection events. Thus, content delivery exchange 120 has access to all data associated with planning of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that owns and operates content delivery exchange 120 conducts one or more content item selection events. In this latter embodiment, content delivery exchange 120 sends one or more content items to the other exchange, which selects one or more content items from among multiple content items that the other exchange receives from multiple sources. In this embodiment, content delivery exchange 120 does not know (a) which content item was selected if the selected content item was from a different source than content delivery exchange 120 or (b) the bid prices of each content item that was part of the content item selection event. Thus, the other exchange may provide, to content delivery exchange 120 (or to a performance simulator described in more detail herein), information regarding one or more bid prices and, optionally, other information associated with the content item(s) that was/were selected during a content item selection event, information such as the minimum winning bid or the highest bid of the content item that was not selected during the content item selection event.

Tracking User Interactions

Content delivery exchange 120 tracks one or more types of user interactions across client devices 152-156 (and other client devices not depicted). For example, content delivery exchange 120 determines whether a content item that content delivery exchange 120 delivers is presented at (e.g., displayed by or played back at) a client device. Such a "user interaction" is referred to as an "impression." As another example, content delivery exchange 120 determines whether a content item that exchange 120 delivers is selected by a user of a client device. Such a "user interaction" is referred to as a "click." Content delivery exchange 120 stores such data as user interaction data, such as an impression data set and/or a click data set.

For example, content delivery exchange 120 receives impression data items, each of which is associated with a different instance of an impression and a particular content delivery campaign. An impression data item may indicate a particular content delivery campaign, a specific content item, a date of the impression, a time of the impression, a particular publisher or source (e.g., onsite v. offsite), a particular client device that displayed the specific content item, and/or a user identifier of a user that operates the particular client device. Thus, if content delivery exchange 120 manages multiple content delivery campaigns, then different impression data items may be associated with different content delivery campaigns. One or more of these individual data items may be encrypted to protect privacy of the end-user.

Similarly, a click data item may indicate a particular content delivery campaign, a specific content item, a date of the user selection, a time of the user selection, a particular publisher or source (e.g., onsite v. offsite), a particular client device that displayed the specific content item, and/or a user identifier of a user that operates the particular client device. If impression data items are generated and processed properly, a click data item should be associated with an impression data item that corresponds to the click data item.

Lead Generation System

In some embodiments described herein, a purpose of at least some content providers 112-116 is to identify leads, which are prospective consumers of a product or service. A lead is created when an individual or business shows interest and provides contact information. A lead may have shown interest by filling out an electronic form with personal information (or at least voluntarily submitting personal information), such as first name, last name, contact information (e.g., work phone number, work email address), geographic location (e.g., city, state, country, zip code), job title, job function, seniority (e.g., manager, director, VP), employer name, size of employer (e.g., number of employees/contractors of the employer), industry, one or more academic degrees attained, field of study at a previously attended academic institution, name of academic institution (s) attended, academic start date, academic graduation date, skills, and length of employment with the current job title and/or with a particular employer. A content delivery campaign whose purpose is to generate leads for a content provider is referred to herein as a "lead generation campaign."

Lead generation system 130 may comprise multiple computing elements and devices, connected in a local network or distributed regionally or globally across many networks, such as the Internet. Thus, lead generation system 130 may comprise multiple computing elements, including file servers and database systems. Lead generation system 130 may be part of content delivery exchange 120 or may be separate therefrom.

Although depicted as being communicatively coupled to content delivery exchange 120 and publisher system 140, lead generation system 130 may also be communicatively coupled to content providers 112-116 (e.g., when transmitting lead notification messages) and to client devices 152-156 when sending user data to, and receiving user data from, client devices 152-156.

Lead generation system 130 is activated when a user selects a content item of a lead generation campaign. A lead generation campaign is associated with (or corresponds to) an electronic form that includes one or more fields in which a user may input his/her information, such as text, an image, a graphics file, or a video file. For example, a user is presented with a content item on his/her computing device and selects the content item, which causes a request that includes a content item identifier to be transmitted to lead generation system 130. Lead generation system 130 receives the request, identifies the content item identifier, uses the content item identifier to identify elements of an electronic form that is associated with the content item identifier, and causes the electronic form to be presented on the computing device. The electronic form allows a user to enter (or modify) one or more data items pertaining to the user, such as first name, last name, email address, job title, and employer name.

Obtaining User Information

In an embodiment, a content provider contracts with content delivery exchange 120 to obtain user data from content delivery exchange 120 (or another trusted source). The user data is, originally, at least partially provided by users and stored in their respective profiles in a user profile repository. An example of a user profile repository is one that is maintained by a social network provider, such as LinkedIn. A user registers with the social network provider and creates a user profile by inputting information about the user (or importing the information from another source), such as first name, last name, job title, employment status, work email address, personal email address, phone number, mailing address, current employer name, academic institutions attended, academic degrees earned, skills, interests, organizations joined, a work summary, and a work history listing past positions and past employers. Other users may be able to view a particular user's profile, such as any user who has access to the Internet, only users who have also registered with the social network provider, or only users who are confirmed friends or connections of the particular user.

A user profile may also include user information that the user did not explicitly provide to his/her profile, such as information derived based on the user's online activity, including web pages visited, content viewed or requested, organizations (e.g., companies) followed, posts viewed, liked, and/or commented upon, and the comments themselves.

In an embodiment, in response to determining that a user has selected a content item of a lead generation campaign, lead generation system 130 retrieves user information associated with the user (e.g., from a user profile repository), populates an electronic form associated with the lead generation campaign, and causes the electronic form to be presented (on a computing device of the user) along with the retrieved user information. Thus, the electronic form may be automatically pre-filled with different data items of the user information.

In a related embodiment, instead of displaying the retrieved user information (which would provide an option for the user to view the retrieved information before submitting), lead generation system 130 sends the retrieved user information to the corresponding content provider. Such a sending may occur after lead generation system 130 sends a lead notification to the content provider, which lead notification allows the content provider to subsequently request the user information.

An advantage that automatic filling of an electronic form has over manually filling is that manually filling an electronic form is more prone to errors. An advantage that server-based filling of an electronic form has over browser-based filling is that using a trusted remote server is more secure and less likely to result in tampering by the user.

In an embodiment, a user's profile information is securely stored on a mobile device (e.g., a tablet or smartphone) that executes a mobile application that is configured to communicate with content delivery exchange 120 and/or lead generation system 130. Thus, the profile information that is stored on the mobile device is used to automatically fill an electronic form that may be displayed on the mobile device.

Customizable Forms Based on Retrieved User Information

In an embodiment, lead generation system 130 presents different electronic forms to different users of the same lead generation campaign. Such customized presentation may be based on what user information is available. For example, if five entity attributes (or types of user information) are requested for each lead and only information pertaining to three of the five entity attributes are retrievable (e.g., first name, last name, and job title), then lead generation system 130 presents a first electronic form that requests information pertaining to the two remaining entity attributes (e.g., current employer and geographic location). For another potential lead, user information pertaining to only two entity attributes may be known or retrievable (e.g., first name and last name). Thus, lead generation system 130 presents a second electronic form that requests information pertaining to the three remaining entity attributes. The two electronic forms may differ in that the first electronic form includes three user data items and the second electronic form includes two user data items. In both cases, the respective users do not have input the information that has already been pre-filled by lead generation system 130.

Customizable Forms Based on Content Provider Input

In an embodiment, each instance of an electronic form (regardless of the content provider involved) requests the same user information.

In an alternative embodiment, different content providers may request different types of user information. Each content provider specifies (or selects) a set of entity attributes, or types of user information, that the content provider would like to retrieve about each lead. The set of entity attributes is associated with a lead generation campaign initiated by the content provider and becomes part of an electronic form that is presented to a user that selects a content item of the lead generation campaign.

Examples of entity attributes includes the types of user information found in user profiles and information derived from online activity and/or user profiles. For example, an IP address associated with a user's computing device may be associated with a particular geographic location or region. As another example, viewing articles about a particular sports team indicates an interest in that particular sports team or sport overall. As another example, a start date (or year) of a particular job position may be used to derive or determine a number of years that the corresponding user has held the particular job position.

Content delivery exchange 120 may present a user interface that lists pre-defined entity attributes that a content provider (or a representative thereof) subsequently selects. The user interface may list pre-defined sets of entity attributes. Such pre-defined sets may have been created by a representative of content delivery exchange 120 or may have been created by the other content providers or by the same content provider. For example, content provider 112 may have an account with content delivery exchange 120. Under the account, a representative of content provider 112 selects a first set of entity attributes for a first lead generation campaign. Later, under the account, another representative of content provider 112 is presented with the first set of entity attributes for a second lead generation campaign.

Different content providers may select different sets of entity attributes. For example, one content provider may select first name, last name, job title, and current employer name while another content provider may select first name, job function, and skills. Additionally, the same content provider may select different sets of entity attributes for different lead generation campaigns that the content provider establishes.

In an embodiment, content providers are allowed to specify one or more entity attributes and/or one or more questions that potential leads are allowed to fill in manually. For example, an electronic form may include one or more pre-defined entity attributes that a content provider selected and one or more questions that the content provider specified. As another example, an electronic form may include only content provider-specified questions.

Editable Attribute Values

In an embodiment, an entity attribute is associated with an editable indicator that indicates whether a value retrieved for the entity attribute may be edited or modified by the user when the user is presented with an electronic form that includes the value. Such a value may be considered a default value for the user, which default value is editable by the user. If no editable indicator is selected for an entity attribute, then a default may be that a value for the entity attribute is editable or that the value for the entity attribute is non-editable.

In an embodiment, a representative of lead generation system 130 specifies an editable indicator for one or more entity attributes. Additionally or alternatively, a content provider is allowed to specify an editable indicator for one or more entity attributes. For example, lead generation system 130 specifies that a first entity attribute is non-editable while a content provider specifies that a second entity attribute (that is different than the first entity attribute) is non-editable. As another example, lead generation system 130 may specify that a particular entity attribute (e.g., email address) is editable while content providers are prevented from specifying that the particular entity attribute is non-editable. As another example, lead generation system 130 may specify that a particular entity attribute is non-editable while content providers are prevented from specifying that the particular entity attribute is editable. In these latter two examples, content providers are not allowed to "overrule" the editable setting established by lead generation system 130. In an embodiment, content providers are allowed to overrule such editable settings, which makes the editable settings established by lead generation system 130 default settings.

In an embodiment, when lead generation system 130 receives a request for an electronic form, lead generation system 130 determines, for each entity attribute associated with an electronic form, whether the entity attribute is associated with non-editable data that indicates that users are not allowed to edit a user value (or profile data item) associated with the entity attribute. If so, then lead generation system 130 may perform one of the following two actions: (1) not present the user value or (2) presents the user value but with a visual indication that the value is not editable. In the last case, although the electronic form presents the user value, there is no way for the user to modify (e.g., delete or update) the user value. The electronic form may include a text field that includes the user value, but that is grayed out, indicating that the user value is not editable.

Thus, some user values in an electronic form may be editable while other user values in the electronic form may not be editable.

Derivable Attribute Values

In an embodiment, lead generation system 130 derives a user value for an entity attribute based on data that is not explicit within the corresponding user profile. For example, an entity attribute may be length of time of being employed at a particular company, which may be derived by subtracting an end date specified in a user profile (or current date, if no end date is specified in the profile) from a start date specified in the user profile. Similarly, a length of time of having a particular job title may be determined based on how long the user has been associated with the job title. Such a length of time may be determined by analyzing a work history of the user (in the user's profile) and totaling the number of years that the user has had the job title at one or more organizations indicated in the work history.

As another example, a geographic location of a user may be determined by identifying an IP address of a computing device that the user has employed and mapping the IP address (whether an IPv4 address or an IPv6 address) to a geographic location.

As another example, interests of a user may be determined based on activities that the user has performed online, such as which profile pages the user has viewed, which articles or blogs the user has viewed, liked, or commented, which groups (e.g., a hiking group) the user has joined, and which entities (e.g., a particular singer or a certain company) the user has followed. As a specific example, if a user reads articles on the big data analytics, then the user is determined to be interested in big data analytics.

As another example, values of some entity attributes (e.g., skills and interests) of a particular user may be determined based on "similar" users. A "similar" user may be one that shares one or more entity attributes in common with the particular user, one that is connected to the particular user in a social graph, and/or one that has provided an endorsement (e.g., through a social network provider) of the particular user. A "connection" between two users is created when both users provide input that indicates acknowledgement, to a third party (e.g., a social network provider), that the users know each other. Additionally or alternatively, a "connection" between two users may be created between two users if it is determined that each user has a contact list that contains the other user's name, email address, phone number, or other contact information.

As another example, a skill for a particular user may be derived from one or more endorsements that the particular user received (e.g., through a social network provider) from other users. Lead generation system 130 may use an endorsement of a user to populate a skill field in an electronic form for the user. Before leveraging an endorsement, lead generation system 130 (or another component) may first check whether the endorsement maps to or is similar to a known (e.g., pre-defined or standardized) skill. If so, then the mapped to (or similar) skill is used to populate the electronic form. Otherwise, the endorsement is used to populate the electronic form or the corresponding text field is left blank for the user to fill in.

Deriving certain attribute values for a particular user may be performed prior to any selection, by the particular user, of a content item of a lead generation campaign, which selection causes a (at least partially) pre-filled form to be displayed. Additionally or alternatively, deriving some attribute values for a particular user may be performed "on-the-fly," or in response to user selection of the content item.

Multiple Data Sources for an Entity Attribute

For some entity attributes, there may be multiple data sources from which to retrieve a value. For example, for email address, there may be two data sources and, for employer name, there may be three data sources. The multiple data sources may include a particular portion of a user's profile, data sources outside user profiles, and even data sources that are remote relative to content delivery exchange 120, lead generation system 130, and publisher system 140.

For example, an entity attribute may be email address and a first data source is a user's work email address and a second data source is a home email address, both data sources being from different portions of the user's profile.

As another example, for geographic location, a first data source may be a user's profile and a second data source may be an IP address that is associated with the user. The IP address may be tracked by content delivery exchange 120 or publisher system 140 and associated with a profile into which the corresponding computing device logs.

As another example, for a name of an organization (e.g., an academic institution or an employer), a first data source may be a user's profile and a second data source may be a standardized set of organization names, which may have been established by the party or entity that operates lead generation system 130 or by another party. For example, when a user creates a profile and specifies a name of an academic institution (e.g., "Cal"), a social network provider compares the name to one or more names in the standardized set of names (which may be organized alphabetically). If there is no exact match, then one or more "fuzzy" matches are made, such as (a) matching common misspellings of standardized names with the user-provided name or (b) matching known/common nicknames or abbreviations of standardized names with the user-provided name. For example, "Cal" is a colloquial reference for "University of California Berkeley." A final match with a standardized name may be selected automatically (e.g., based on a match score being above a certain threshold) or manually. Thus, a user's profile may be associated with two names of an academic institution: the name that the user provided and a standardized name. When other users view the user's profile, the profile may include one or both of the two names. A user may be provided the option (e.g., when viewing his/her own profile) to select a standardized name to replace a user-provided name.

As another example, for skills, a first data source may be a mapping of skills to categories (which may have been established by the party or entity that operates lead generation system 130 or by another party) and a second data source may be a user's profile. For example, when a user creates a profile and specifies a skill (e.g., "C programming"), a social network provider determines whether the skill is in the skill-category mapping. If there is no exact match, then one or more "fuzzy" matches are made, such as matching common misspellings of skills in the mapping with the user-specified skill. A final match with a standardized name may be selected automatically (e.g., based on a match score being above a certain threshold) or manually. Thus, the user's profile may be associated with two names for a skill: the name that the user provided and a name in the skill-category mapping.

In an embodiment, multiple data sources for an entity attribute is associated with a priority or ranking, such that one data source is ranked higher relative to other data sources. If a user value for an entity attribute is unavailable from the highest ranked data source, then the next highest ranked data source is checked for a user value, until a user value is identified for the entity attribute. For example, a work email address in a user's profile may be the highest ranked data source for the entity attribute "email address" while a personal email address in the user's profile may be the lowest ranked data source for the entity attribute "email address."

One data source for an entity attribute may be considered a primary data source and any other data sources for the entity attribute may be considered secondary data sources. If there are multiple secondary data sources, then even the secondary data sources may be ranked relative to each other.

In an embodiment, a data source's ranking dictates whether the corresponding entity attribute is editable. For example, if a primary data source is available for a particular entity attribute, then a value from that primary data source is non-editable. If the primary data source is not available for the particular entity attribute, then a value from the secondary data source (if one exists) is editable. For example, if a user's associated geographic location is specified in the user's profile, then the specified geographic location is displayed in an electronic form and is not editable. However, if a user's associated geographic location is not specified in the user's profile, then a geographic location of the user's current (or most recent) employer or current (or most recent) academic institution is identified and used to fill in a text field of an electronic form and the text field is editable.

One advantage that a defined hierarchy of data sources has over a browser-based filling of an electronic form is that the latter approach has no intelligence built into the browser, other than displaying multiple values as options for a particular attribute, such as email address. With the defined hierarchy approach, the lead generation system is able to include intelligence in selecting the best values for each relevant entity attribute, depending on the available data source.

Internationalization

Some users or members of a social network work in multiple countries or know multiple languages. Additionally, some content providers are interested in leads from certain countries or in leads knowing certain languages.

In an embodiment, a content provider, when creating a lead generation campaign, specifies a language, which will be used to present names of entity attributes and, optionally, values for those entity attributes. A default language may be English or a language that is already associated with the content provider, such as an account setting that specifies a particular language. For example, if an account of a content provider is associated with a particular language and the content provider has created multiple content delivery campaigns (including one or more lead generation campaigns) under the account, then each of the content delivery campaigns is also associated with the particular language.

If a content delivery campaign is associated with a particular (e.g., non-default) language, then textual content of one or more content items of the content delivery campaign may be limited to that particular language. Also, for lead generation campaigns, the content provider may expect requested user information to be in the particular language.

In an embodiment, lead generation system 130 has access to translations of certain names. The names may be of an organization (e.g., company, government department/agency, charity, civic organization, academic institution, trade association), a skill, a geographic location, a job title, and/or a job function. For example, "LinkedIn" may map to a particular company identifier, which is mapped to (e.g., in a second mapping that is different than the first mapping) twenty different languages. If a user's profile includes "LinkedIn" or another name that can be matched to "LinkedIn" and "LinkedIn" is associated with a particular unique identifier that is associated with multiple translations of "LinkedIn", then lead generation system 130 (1) identifies a particular language associated with (or specified by) the corresponding lead generation campaign that requests a name of a potential lead's employer and (2) uses the translation mapping to determine whether a translation of "LinkedIn" exists in the particular language. If so, then the translation is inserted into the electronic form at the appropriate location (e.g., text field) and displayed to the user. Otherwise, the employer name in the user's profile is inserted into the electronic form. Thus, the content provider that initiated the lead generation campaign may accept the employer name from the user's profile. Types of names other than an organization name may also have standardized names and associated identifiers, each of which is mapped to multiple translations of a given name (e.g., a skill or a job title).

In an embodiment, when selecting entity attributes for an electronic form of a lead generation campaign, a content provider (or representative thereof) is presented, via a user interface, with a set of pre-defined entity attributes in a particular language. The user interface allows the content provider to select another language from among multiple possible languages (e.g., Spanish, German, Chinese, French). In response to the content provider selecting another language, the user interface is updated to display the set of pre-defined entity attributes (or a subset thereof) in the selected language.

In an embodiment, a user has a multi-language profile where certain attributes of the user are specified multiple times for a particular attribute, such as job title in two languages and/or company name in two languages. In this embodiment, lead generation system 130 determines whether a user that selected a content item of a lead generation campaign is associated with a multi-language profile and, if so, determines, for each requested entity attribute of the lead generation campaign, whether the multi-language profile contains a value for that entity attribute in the requested language associated with the lead generation campaign. If so, then lead generation system 130 includes that value in an electronic form. In this embodiment, this multi-language profile check is performed prior to relying on a mapping of an identifier (or a name) to multiple translations of the name. If the user does not have a multi-language profile, then lead generation system 130 uses a mapping of an identifier (or a name) to multiple translations of the name (that is not in the correct language).

In a related embodiment, if a user's profile has a value (for an entity attribute) in the language of the lead generation campaign, then the value is made non-editable by the user in the electronic form. Otherwise, any value that lead generation system 130 includes (whether through a pre-defined mapping or machine translation) in the electronic form for that entity attribute is made editable, such that the user is allowed to edit or modify the value. This is an example of a hierarchy (or ranking) of multiple data sources being available for a particular entity attribute.

Automatic translation (e.g., using a translation model) of a particular attribute value or leveraging one or more mappings to identify a translation of the particular attribute value may be performed in response to a user selecting a content item of a lead generation campaign.

Lead Storage

Multiple approaches may be used to store data about a new lead. In one approach, a user selects a graphical element (e.g., a button) that is displayed concurrently with an electronic form that includes values for multiple entity attributes. User selection causes lead generation system 130 to store the values in a lead database that stores user data about each user of one or more users.

In another approach, a user selects a graphical element (e.g., a link or a button) that is part of a content item of a lead generation campaign, where no electronic form is displayed. In this approach, the user is not first presented with the user information that is stored in a lead database. However, the content item may list the entity attributes whose values will be retrieved from the user's profile and sent to the content provider in response to the user's selection of the content item.

Regardless of which approach is used, a lead database may be organized in multiple ways, including by content provider, lead generation campaign, time, geography, one or more demographic criteria, and/or a combination thereof. For example, data about leads for a first content provider are stored in table A while data about leads for a second content provider are stored in table B.

As another example, data about leads identified using a first lead generation campaign are stored in table A while data about leads identified using a second lead generation campaign are stored in table B. Example fields or columns of a table that stores lead data may be the entity attributes of the corresponding lead generation campaign. In this example, different tables may correspond to the same content provider if the content provider has initiated multiple lead generation campaigns and the different lead generation campaigns request different sets of entity attributes.

Example Process

Figure 2A:
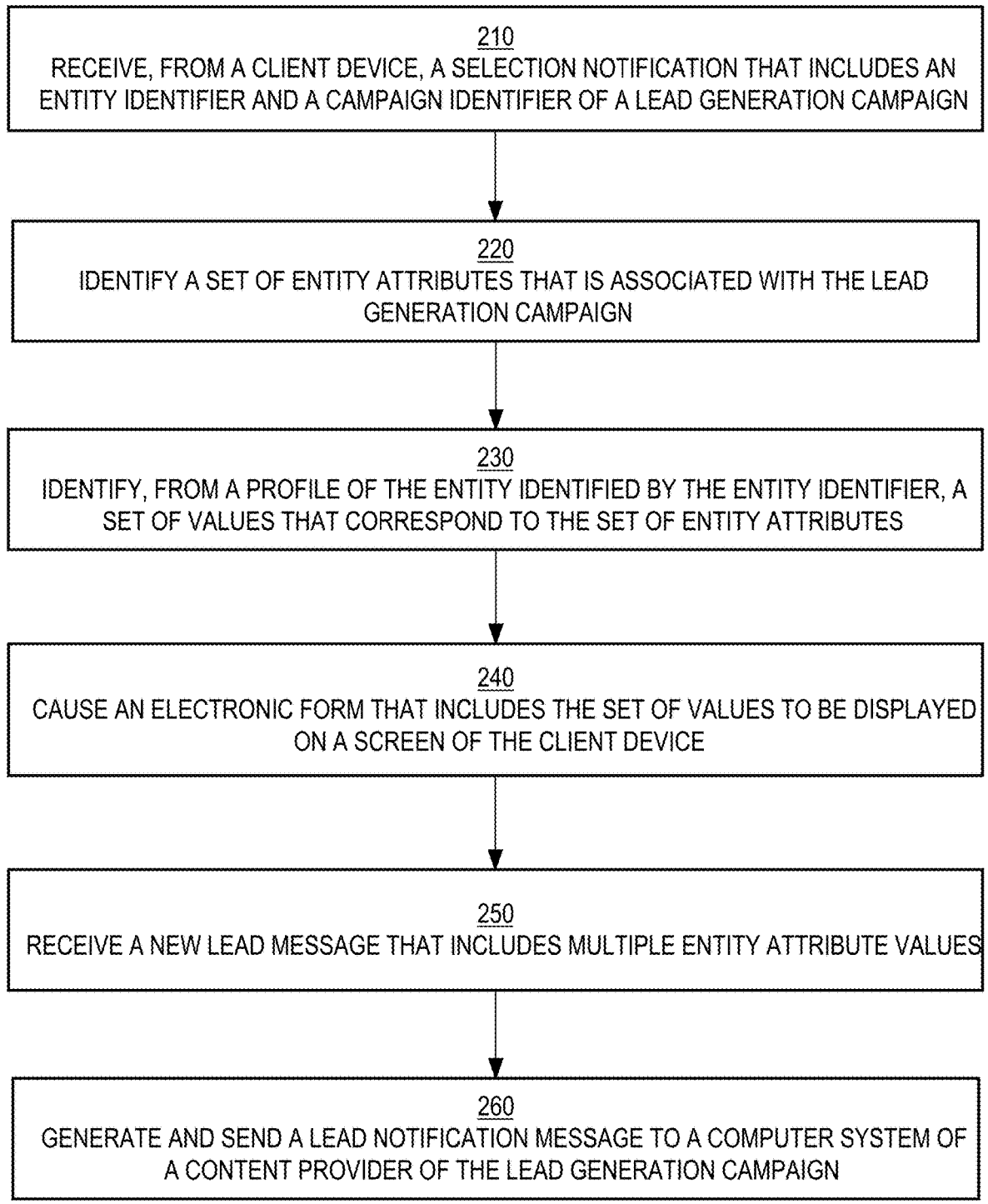
FIG. 2A is a flow diagram that depicts an example process for securely obtaining trusted user data, in an embodiment.

FIG. 2A is a flow diagram that depicts an example process 200 for securely obtaining trusted user data, in an embodiment. Process 200 may be implemented by lead generation system 130.

At block 210, lead generation system 130 receives a selection notification from client device 152. The selection notification may come directly from client device 152 (through one or more computer networks) or may first be routed to publisher system 140 and forwarded to lead generation system 130. The selection notification is generated and transmitted in response to a user's selection of a content item of a lead generation campaign initiated by content provider 112. The content item may have been displayed on a web page provided by publisher system 140 and displayed by client device 152. The selection notification includes (1) an entity identifier that uniquely identifies the user or his/her account and (2) a campaign identifier that uniquely identifies the lead generation campaign.

Figure 2B:
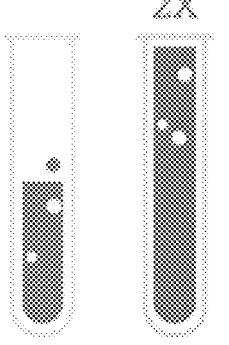
FIG. 2B is a screenshot of an example content item from a lead generation campaign, in an embodiment.

FIG. 2B is a screenshot of an example content item 270 from an example lead generation campaign, in an embodiment. Content item 270 includes a "Sign Up" graphical element 272 that allows a user to sign up for the associated service. The screenshot indicates that content item 270 is displayed in a "Home" tab. The screenshot indicates that other tabs are available to obtain additional content, including a "My Network" tab (to view information about activities of other users in the viewer's social network), a "Messaging" tab (to view previous messages sent to and from the viewer and to compose new messages), a "Notifications" tab (to view notifications tailored to the viewer), and a "Jobs" tab (to view relevant job openings for the viewer).

At block 220, lead generation system 130 identifies a set of entity attributes that is associated with (or specified by)

the lead generation campaign. This identification step may be made possible due to the campaign identifier included in the lead generation campaign. Each lead generation campaign and its associated predefined attributes may be stored in a content delivery campaign database accessible to lead generation system 130.

At block 230, lead generation system 130 identifies, from a profile of the user, a set of entity attribute values that correspond to at least a subset of the set of entity attributes. The profile of the user may be identified using the entity identifier included in the selection notification. The user's profile might not include a value for one or more entity attributes in the set of entity attributes.

At block 240, lead generation system 130 causes an electronic form to be displayed on a screen of client device 142. The electronic form includes the set of entity attribute values identified in block 230. The electronic form may include a text field for each entity attribute associated with the corresponding lead generation campaign. If a value is missing for one of the entity attributes, then the corresponding text field may be left blank. The electronic form may include content that invites the user to submit the displayed attribute values, to correct any of the displayed attribute values, and/or to input any attribute values that are missing from the electronic form.

Figure 2C:
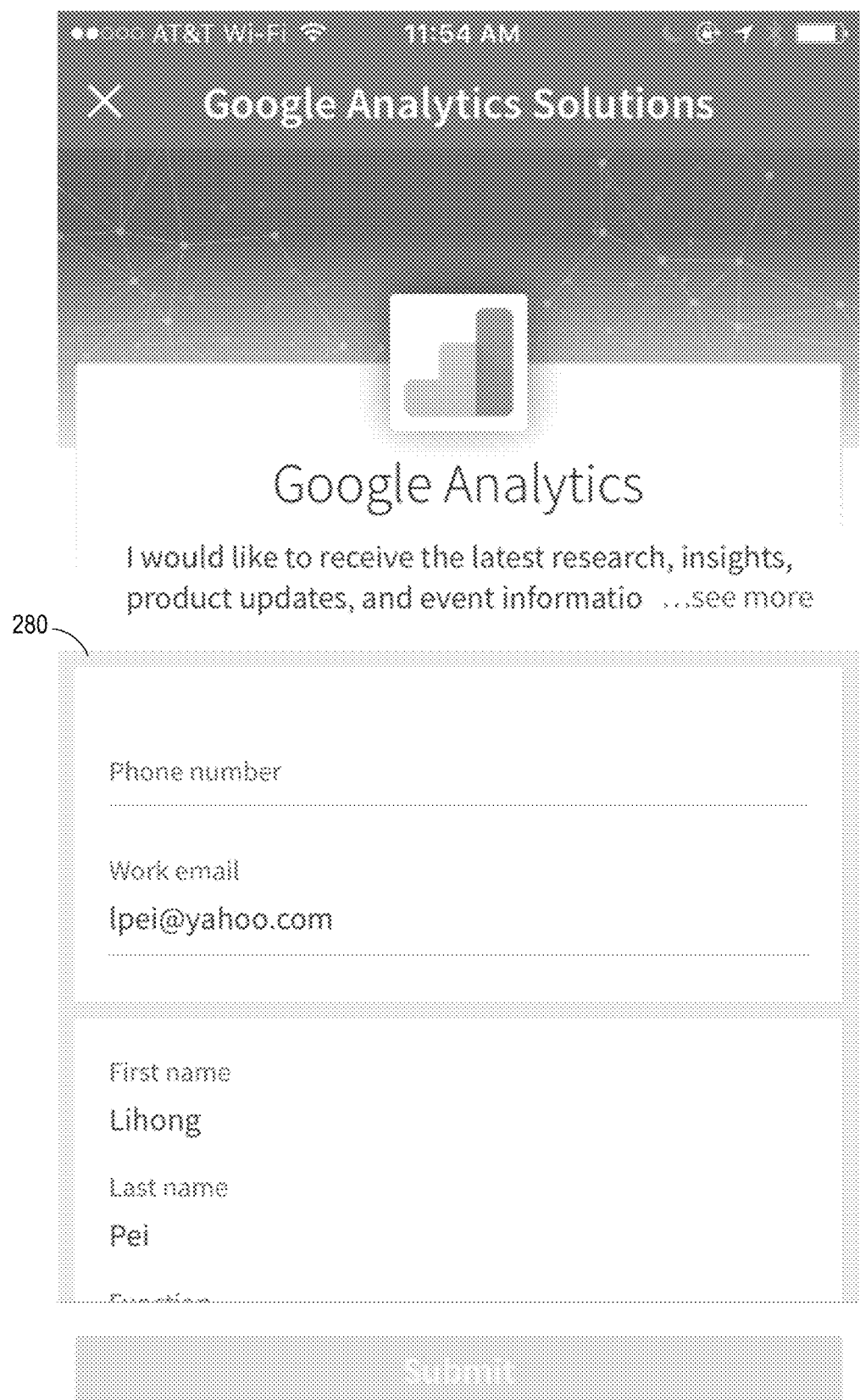
Figure 2D:
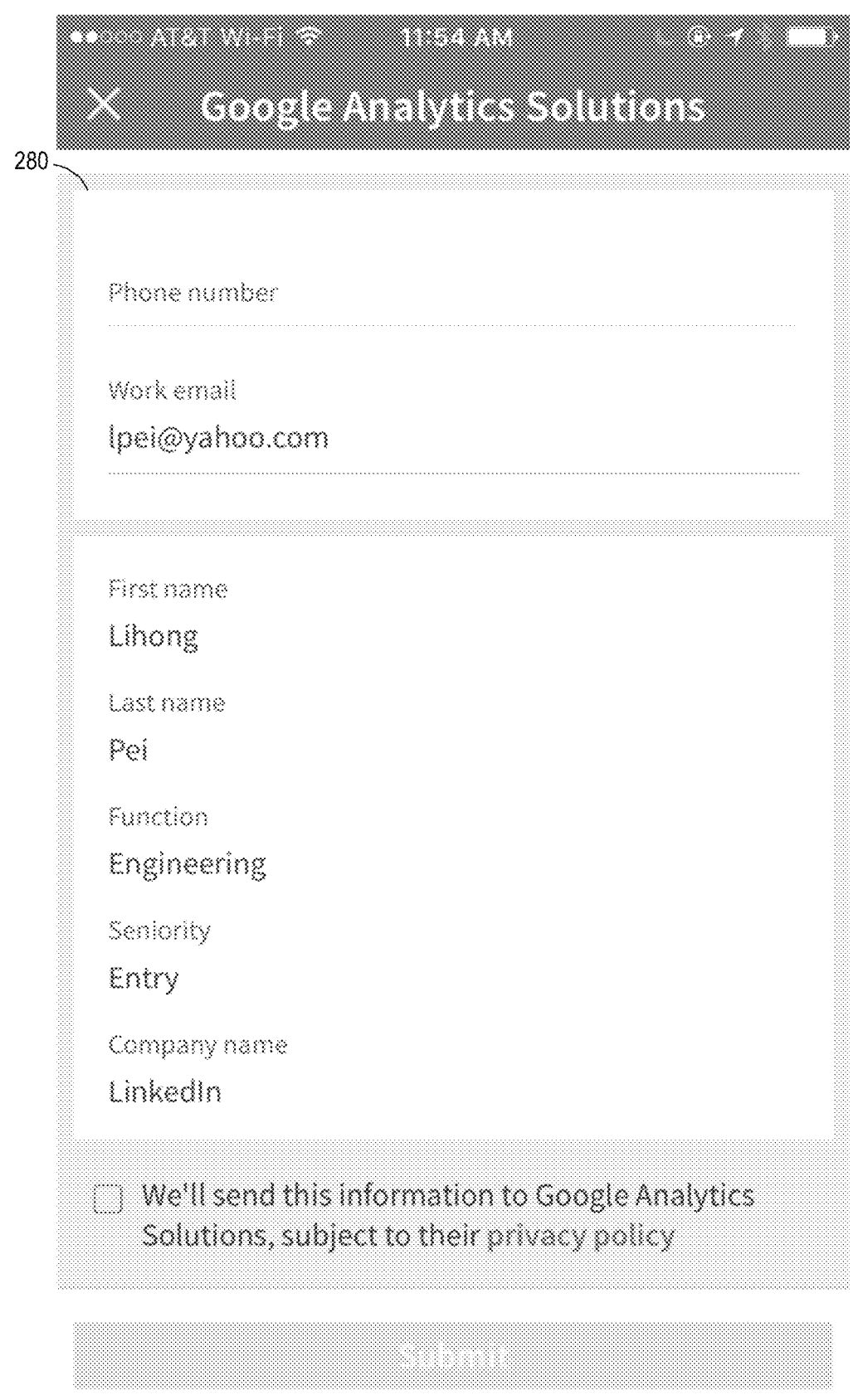

FIGS. 2C-2F are screenshots of an example electronic form with editable and non-editable fields, in an embodiment. FIGS. 2C and 2D are screenshots of an instance 280 of the electronic form. The two screenshots depict a different set of elements of instance 280 due to the size of the sets of elements. Both screenshots depict a work email address, a first name, and a last name of the viewer. However, the first screenshot depicts a non-form element indicating the product or service of the lead generation campaign, while the second screenshot depicts a job function, a seniority level, and an employer name of the viewer. In this example, the non-editable fields are first name, last name, function, seniority, and company name. The editable fields are phone number and work email. Thus, even though the work email field is pre-filled by lead generation system 130, a user is able to modify that field.

Figure 2E:
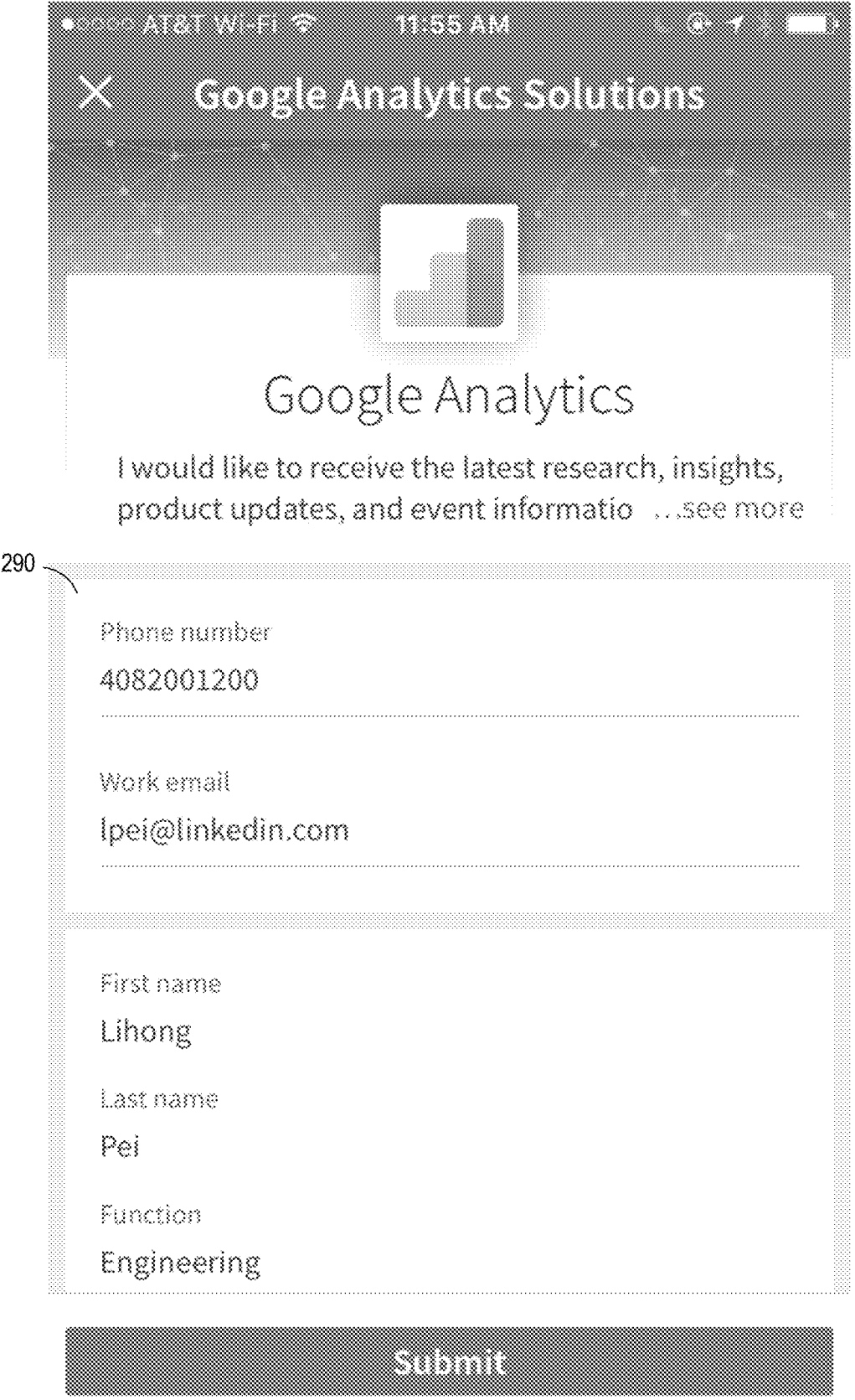

FIGS. 2E and 2F are screenshots of an instance 290 of the electronic form. The screenshots of instance 290 are similar to the screenshots of instance 280 except that instance 290 is a state of the electronic form after the viewer has made changes to the electronic form. Instance 290 includes text (entered by the viewer) in the phone number field and different text (entered by the viewer) in the pre-filled work email address.

At block 250, lead generation system 130 receives a new lead message that includes multiple entity attribute values. All or some of the attribute values in the new lead message may be from the user's profile. Others of the attributes values may have been entered by the user in the electronic form.

At block 260, lead generation system 130 generates a lead notification message and causes the lead notification message to be transmitted over one or more computer networks to a computer system of the content provider that initiated the lead generation campaign. The lead notification message may ultimately be transmitted by content delivery exchange 120 or content delivery exchange 120 may be bypassed when transmitting the lead notification message.

High Performance Multi-Data Center Data Retrieval

When notifying a content provider that a new lead has been discovered, it may be important that the content provider have immediate access to information about the new lead. Upon receiving a lead notification message, a content provider may send a request to lead generation system 130 for new lead data. If lead generation system is implemented on a single data center and all requests are handled by that data center, then the new lead data information should be available. However, in some embodiments, lead generation system 130 is implemented on multiple data centers that are able to communicate with each other to retrieve requested data that is not available at one or more data centers. In some of those embodiments, data created and stored at one data center is replicated to each other data center in a group of data centers. However, such replication may take a significant amount of time, such as five minutes. Additionally, replication may fail at times, causing replication time to increase substantially. Thus, if new lead data is stored at data center A and a request for the new lead data arrives at data center B, the new lead data might not yet be available at data center B and the requester (or content provider) will receive a message indicating that the new lead data is not available or does not exist. Such a message is undesirable.

In an embodiment, a notification regarding a new lead includes not only a lead identifier of the new lead, but also a data center identifier that identifies a data center in which the new lead data was initially stored. The notification may be transmitted to the corresponding content provider only after a lead notification service detects that the new lead data was properly stored. The lead identifier and the data center identifier may be encoded in a URL that the content provider (or a representative thereof) may select, causing a (e.g., HTTP GET) request to be transmitted over a network to lead generation system 130. Lead generation system 130 receives the request, identifies a lead identifier, and determines whether the lead identifier exists in storage. If not, then lead retriever service identifies the data center identifier that is encoded in the request and uses the data center identifier to forward the request (or send a modified version thereof) to the corresponding data center. A lead retriever service at that data center uses the lead identifier encoded in the forwarded/modified request to retrieve the lead data that is associated with the lead identifier and sends a reply to the content provider.

Figure 3:
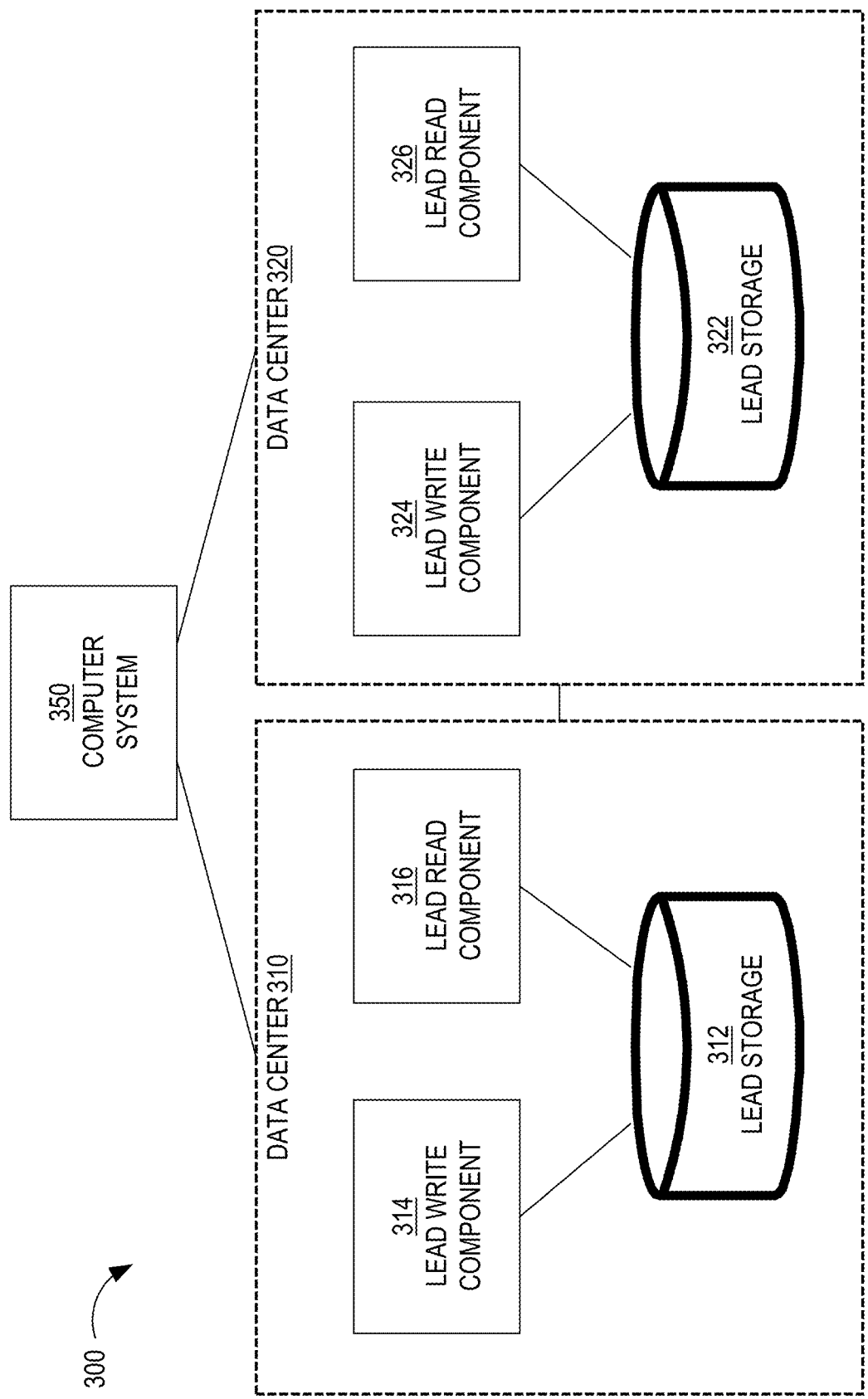
FIG. 3 is a block diagram that depicts an example multi-data center system that allows for high performance lead retrieval, in an embodiment.

FIG. 3 is a block diagram that depicts an example multi-data center system 300 that allows for high performance lead retrieval, in an embodiment.

System 300 includes data centers 310 and 320, although other embodiments may include more than two data centers. Data center 310 includes a lead storage 312, a lead write component 314, and a lead read component 316. Similarly, data center 320 includes a lead storage 322, a lead write component 324, and a lead read component 326. Each lead write component and lead read component is implemented in software, hardware, or any combination thereof. Lead storages 312 and 322 may contain the same content (i.e., lead information) and may be kept in sync. However, at any one point in time, because of the time required to replicate data between data centers, lead storage 312 may contain data that lead storage 324 does not and vice versa.

Within a single data center, each lead storage may be distributed across multiple storage devices, each accessible by the local lead read component and lead write component. Similarly, within a single data center, each lead write component and each lead read component may be distributed across multiple computing devices (e.g., servers), such that a different instance of the component is running concurrently on different computing devices. In this way, if one computing device (or machine) fails, then other instances are available to generate or process requests.

Each data center is communicatively coupled to a computer system 350 of a (e.g., third party) content provider. While FIG. 3 only depicts a single computer system 350, each data center may be communicatively couple to other computer systems.

Figure 4:
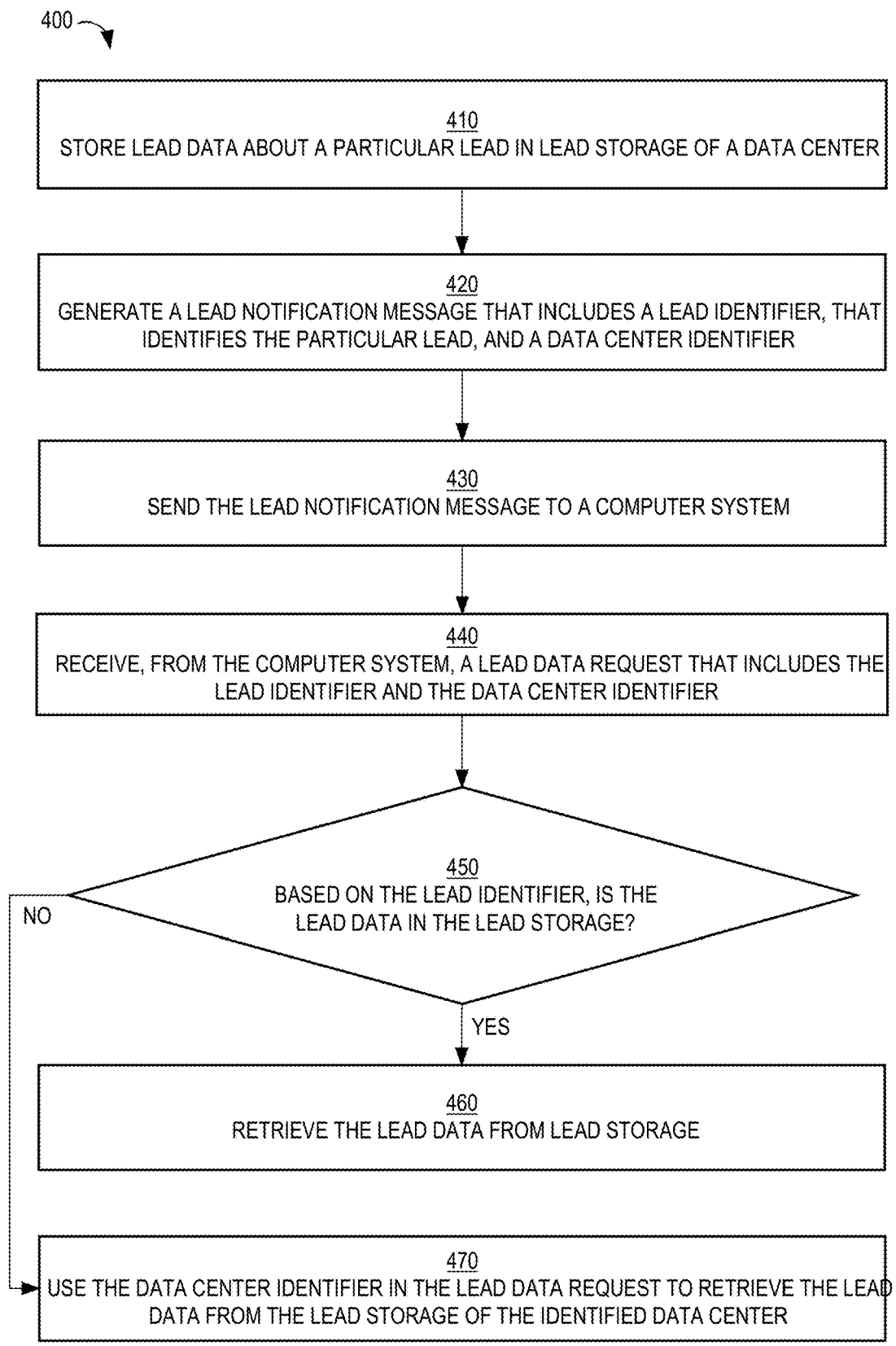
FIG. 4 is a flow diagram that depicts an example process for lead notification and retrieval in a multi-data center environment, in an embodiment.

FIG. 4 is a flow diagram that depicts an example process 400 for lead notification and retrieval in a multi-data center environment, in an embodiment.

At block 410, lead write component 314 stores lead data about a particular lead in lead storage 312. Such storage may be performed in response to user selection of a graphical "submit" button that is displayed adjacent to values (of entity attributes) displayed in an electronic form.

At block 420, lead write component 314 (or another component) generates a lead notification message that includes a lead identifier assigned to the lead data and that includes a data center identifier that identifies data center 310. Block 420 may be performed only after lead write component 314 receives confirmation that lead storage 312 has successfully stored the lead data. The lead identifier might not be known until the confirmation is received.

At block 430, lead write component 314 (or another component not depicted) sends the lead notification message to computer system 350 of a content provider that initiated the lead generation campaign, which is the cause for the receipt of the lead data. The lead notification message may be an HTTP (e.g., PUT) message. The lead notification message may traverse multiple computing nodes, including one or more networks (e.g., the Internet) that are between data center 310 and computer system 350.

At block 440, lead read component 326 receives a lead data request from computer system 350. The lead data request includes the lead identifier and the data center identifier. Alternatively, the lead data request may originate from another computer system that is affiliated with computer system 350. For example, a representative of the content provider may operate a mobile device that is notified of the lead notification message and, in response to input from the representative, the mobile device generates and transmits the lead data request.

At block 450, lead read component 326 determines, based on the lead identifier, whether the lead data is stored in lead storage 322. If so, then process 400 proceeds to block 460. Otherwise, process 400 proceeds to block 470. Between blocks 410 and 450, the lead data may have been replicated from lead storage 312 to lead storage 322.

At block 460, lead read component 326 retrieves the lead data from lead storage 322 and sends, to computer system 350, a lead message that includes the lead data.

At block 470, lead read component 326 uses the data center identifier included in the lead data request to identify a data center that is known to store the request lead data. Lead read component 326 then transmits an intra-system request to data center 310.

The intra-system request may be a forward of the lead data request from computer system 350 to lead read component 316. In that case, lead read component 316 responds with a lead message (that includes the lead data) directly to computer system 350. Alternatively, lead read component 316 responds with the lead message to lead read component 326, which responds directly to computer system 350 with the lead data.

A benefit of embodiments that combine real-time push notification and a multi-data center lead retrieval mechanism is a convenient and efficient way of exchanging high quality information.

Distributed System That Supports Stateless Retry

In some cases, a notification regarding a new lead may not be transmitted to a content provider. Reasons may include a network outage and a server of the content provider being unavailable. However, keeping track of whether a lead notification message has already been transmitted to a content provider for a particular lead is not trivial. One way to keep track is for the transmitter of the lead notification message (e.g., lead write component 314) to (1) store state information about how often a particular lead notification message has been transmitted, (2) be notified if the lead notification message was not successfully received by the content provider, and (3) update the state information accordingly.

In an embodiment, a lead notification message includes retry information and internal (or local) consumers of the lead notification message increment retry counters when the consumers detect that the lead notification message has not been successful received by the appropriate content provider.

Figure 5:
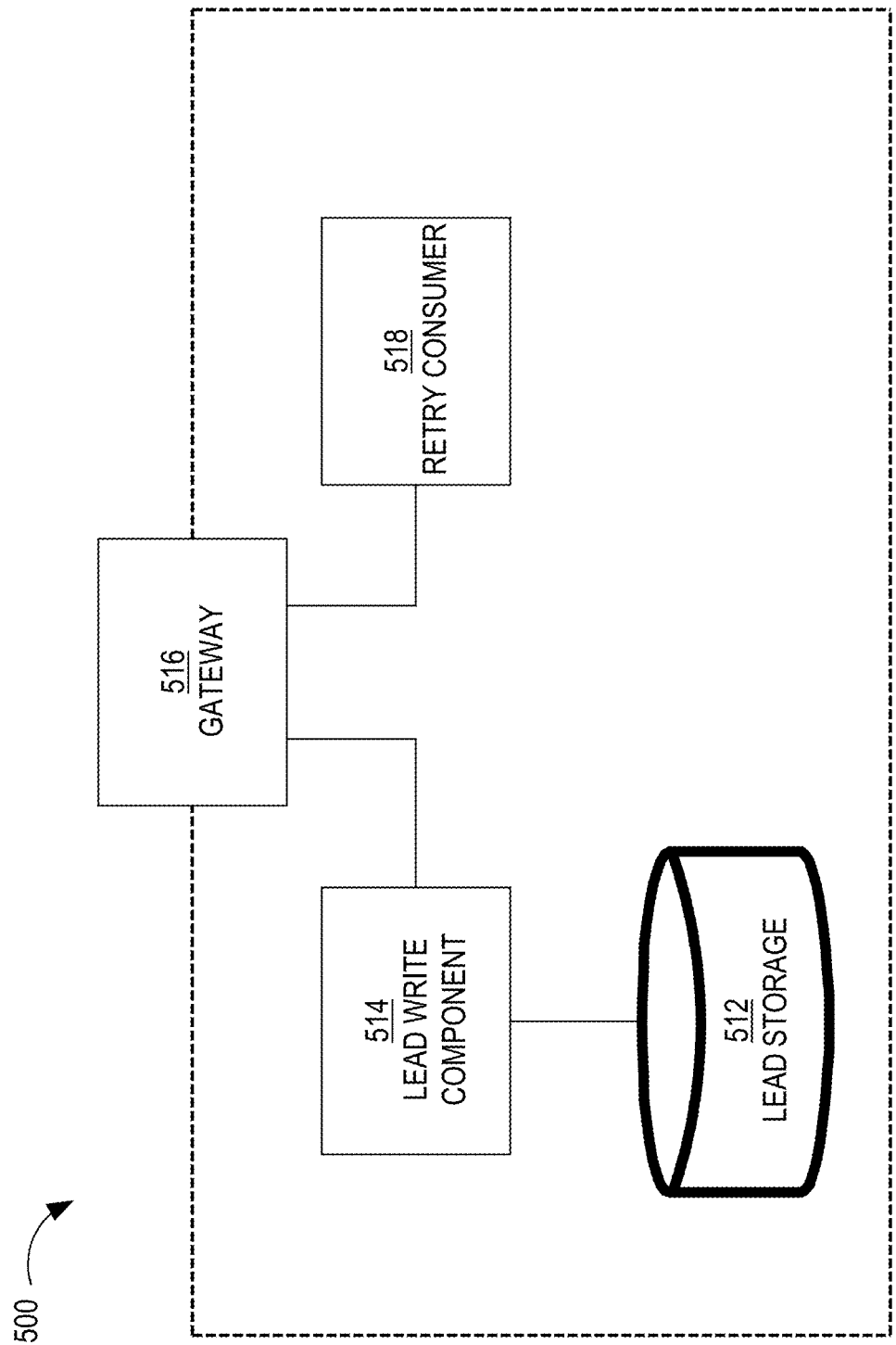
FIG. 5 is a block diagram that depicts an example system that supports stateless retry, in an embodiment.

FIG. 5 is a block diagram that depicts an example system 500 that supports stateless retry, in an embodiment. System 500 includes a lead storage 512, a lead write component 514, a gateway 516, and a retry consumer 518. Each of lead write component 514, gateway 516, and retry consumer 518 is implemented in software, hardware, or a combination of hardware and software. System 500 may include multiple storage devices, multiple lead write components, and multiple gateways.

Lead storage 512 stores data about multiple leads and is communicatively coupled to lead write component 514. Lead write component 514 generates a lead notification message for each new lead that is detected and sends the lead notification message to a computer system of the appropriate content provider. The lead notification message includes a retry value that indicates a number of times that the lead notification message was sent to the appropriate content provider. Initially, this retry value may be 0 indicating that such an attempt has not yet been made by gateway 516.

Gateway 516 receives lead notification messages and transmits lead notification messages to the appropriate content providers. A lead notification message that gateway 516 transmits to a content provider may be a HTTP (e.g., PUT) message that gateway 516 constructs and that includes a lead identifier and, optionally, a data center identifier (e.g., if system 500 includes multiple data centers).

Gateway 516 also receives messages indicating whether a lead notification message was successfully received by the target destination (i.e., a particular computer system of a particular content provider). There may be multiple reasons for a lead notification message not arriving at its destination, including a network issue and an unavailable server of a content provider.

In response to detecting that a lead notification message was not successfully received by a content provider (e.g., through receiving a fail message), gateway 516 notifies retry consumer 518 with a fail message. The fail message includes information from the corresponding lead notification message, such as the retry value, the lead identifier, and, optionally, a data center identifier. In response to receiving a fail message from gateway 516, retry consumer 518 increments the retry value and sends, to gateway 516, a retry message that includes the lead identifier and the incremented retry value. Gateway 516 may treat the retry message like an initial lead notification message. In fact, the retry message may be identical to the original lead notification message that corresponds to the retry message, except for the incremented retry value.

In an embodiment, retry consumer 518 executes logic based on the retry value indicated in a fail message. For example, the higher the retry value, the longer the time-to-live (TTL) setting (or "hop limit") setting in the message that is sent to a computer system of a content provider. As a specific example, for retry values under three, the TTL is set to twenty seconds; for retry values between three and five, the TTL is set to fifty seconds. The initial TTL may be established by lead write component 514 or by gateway 516.

In an embodiment, a lead notification message is implemented as an event in a publish-subscribe event system. Thus, a lead notification message that lead write component 514 generates is considered a lead event (corresponding to a lead notification message described previously), lead write component 514 is considered a publisher of lead events, gateway 516 is considered a subscriber of the lead events generated by lead write component 514, gateway 516 is considered a publisher of fail events (corresponding to fail messages described previously) generated in response to detecting that lead notification messages were not successfully delivered to their respective target destinations, retry consumer 518 is considered a subscriber of the fail events generated by gateway 516, retry consumer 518 is considered a publisher of retry events (corresponding to retry messages described previously), and gateway 516 is considered a subscriber of the retry events generated by retry consumer 518.

In an embodiment, system 500 includes multiple instances of retry consumer 518, each of which may execute on a different machine or computing device. Each instance of retry consumer 518 may process any fail event. However, each fail event is guaranteed to be processed by only one instance of retry consumer 518.

In a related embodiment, system 500 includes multiple data centers, each data center including lead storage, one or more lead write components, at least one gateway, and one or more retry consumers. Even if a data center A generates a lead event, if a fail event results, the fail event may be processed by any retry consumer in any data center, including a data center B that is different than data center A. Such a distributed stateless retry mechanism is made possible because the retry (state) information is part of the lead notification message (and the fail message) itself and each retry consumer (regardless of the data center in which it resides) may execute the same logic whose input is the retry information. Also, if a data center fails, then another data center will be able to process the fail event.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
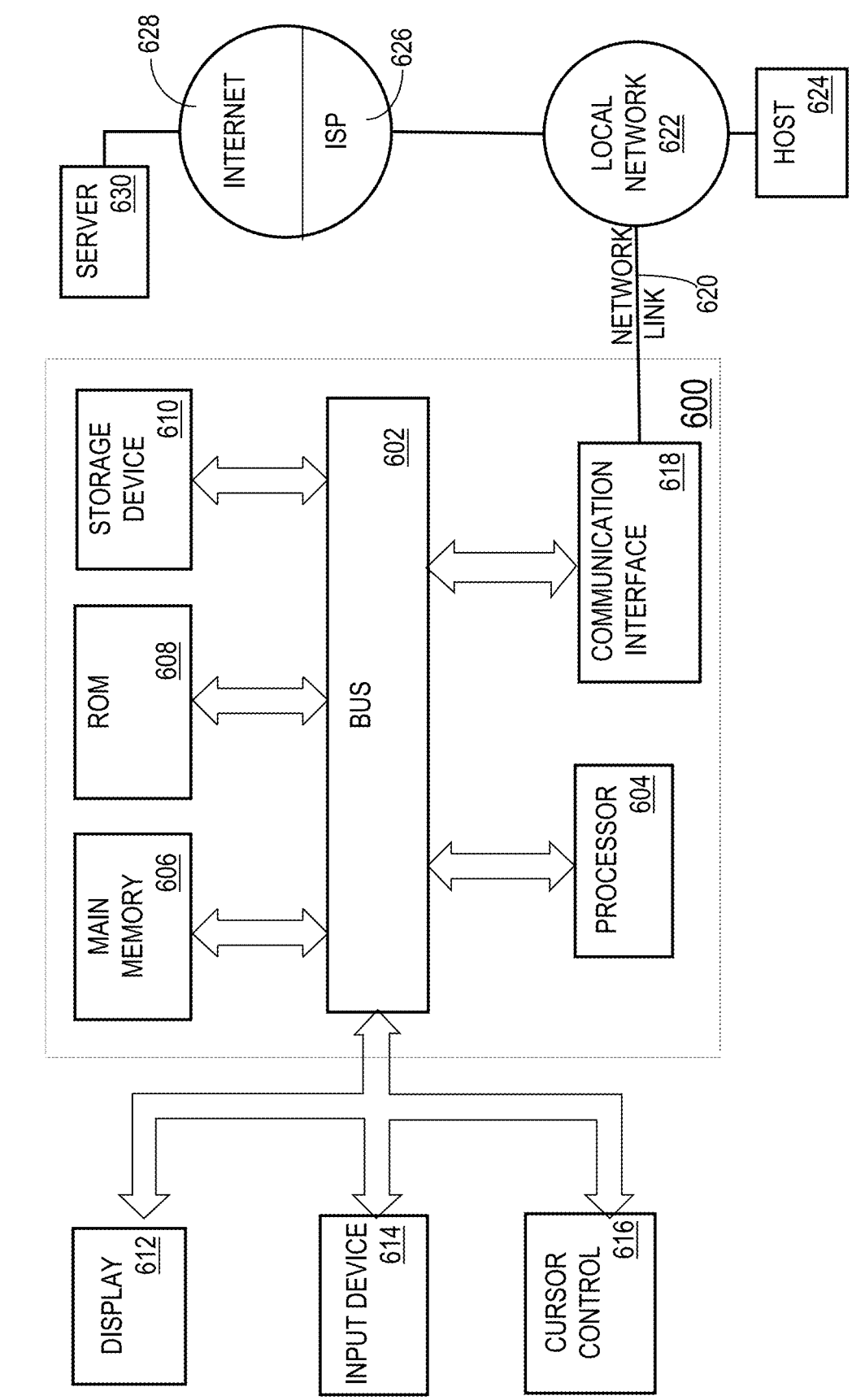
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system provided by a first entity, the system comprising:
   one or more processors;
   one or more storage media storing instructions which, when executed by the one or more processors, cause:
      sending, to a computing device of a second entity that is different than the first entity, a plurality of predefined attributes;
      receiving, from the computing device of the second entity, input that selects a subset of the plurality of predefined attributes;
      receiving, from a computing device of a third entity that is different than the first entity and the second entity, a request;
      in response to receiving the request:
         identifying the subset;
         identifying a plurality of values based on a profile of the third entity, wherein each value in the plurality of values corresponds to a different attribute in the subset;
         determining that a first attribute in the subset is associated with an editable indicator;
         determining that a second attribute in the subset is associated with a non-editable indicator; and
         sending, to the computing device of the third entity, the plurality of values, wherein sending the plurality of values comprises:
            causing a first value, in the plurality of values and corresponding to the first attribute, to be presented on the computing device of the third entity in a first text field that is editable, and
            causing a second value, in the plurality of values and corresponding to the second attribute, to be presented on the computing device of the third entity in a second text field that is not editable.

2. The system of claim 1, wherein the input from the computing device of the second entity specified the editable indicator.

3. The system of claim 1, wherein:
   causing the first value to be presented comprises causing to be presented, with the first value, a first visual indicator that indicates that the first value is editable;
   causing the second value to be presented comprises causing to be presented, with the second value, a second visual indicator that indicates that the second value is not editable.

4. The system of claim 1, wherein the instructions, when executed by the one or more processors, further cause:
   receiving, through the first text field, input provided by the third entity;

wherein the input comprises a third value that is different than the first value.

5. The system of claim 1, wherein the instructions, when executed by the one or more processors, further cause:
    based on a particular attribute in the plurality of predefined attributes, generating a particular value that corresponds to the particular attribute based on (a) a first particular value in the profile and a second particular value in the profile of the third entity or (b) a third particular value that is not in the profile of the third entity.

6. The system of claim 5, wherein generating the particular value comprises generating the particular value based on the third particular value, wherein the third particular value corresponds to the computing device of the third entity, is based on online actions of the third entity, or is from a particular profile of a fourth entity that is different than the third entity.

7. The system of claim 1, wherein the instructions, when executed by the one or more processors, further cause:
    identifying a plurality of sources associated with a particular attribute in the plurality of predefined attributes;
    wherein the plurality of sources is ordered based on a ranking;
    based on the ranking, identifying a first source of the plurality of sources;
    after identifying the first source, determining whether the first source contains, for the third entity, a value corresponding to the particular attribute;
    in response to determining that the first source does not contain, for the third entity, a value corresponding to the particular attribute, identifying a second source of the plurality of sources based on the ranking;
    after identifying the second source, determining whether the second source contains, for the third entity, a value corresponding to the particular attribute.

8. The system of claim 1, wherein the instructions, when executed by the one or more processors, further cause:
    determining a first language that is associated with the second entity;
    determining that the plurality of values includes a particular value that is in a second language that is different than the first language;
    based on a mapping that associates a plurality of translated values with each other, determining that the particular value is associated with the mapping;
    based on the first language that is associated with the second entity, identifying a translated value from the plurality of translated values.

9. The system of claim 1, wherein the plurality of predefined attributes include two or more of a group consisting of job title, job function, current employer, skill, academic degree, and email address.

10. The system of claim 1, wherein the request is a first request and the plurality of values is a first plurality of values, wherein the instructions, when executed by the one or more processors, further cause:
    receiving, from a computing device of a fourth entity that is different than the first entity, the second entity, and the third entity, a second request;
    in response to receiving the second request:
        identifying the subset;
        identifying a second plurality of values based on a profile of the fourth entity, wherein each value in the second plurality of values corresponds to a different attribute in the subset;
        determining that the first attribute in the subset is associated with a second editable indicator;
        determining that the second attribute in the subset is associated with a second non-editable indicator; and
        sending, to the computing device of the fourth entity, the second plurality of values, wherein sending the second plurality of values comprises:
            causing a third value, in the second plurality of values and corresponding to the first attribute, to be presented on the computing device of the fourth entity in a third text field that is editable, and
            causing a fourth value, in the second plurality of values and corresponding to the second attribute, to be presented on the computing device of the fourth entity in a fourth text field that is not editable.

11. The system of claim 1, wherein the input is first input, the subset is a first subset, and the request is a first request, wherein the instructions, when executed by the one or more processors, further cause:
    sending, to a computing device of a fourth entity that is different than the first entity, the second entity, and the third entity, the plurality of predefined attributes;
    receiving, from the computing device of the fourth entity, second input that selects a second subset, of the plurality of predefined attributes, that is different than the first subset;
    receiving, from a computing device of a fifth entity that is different than the first entity the second entity, the third entity, and the fourth entity, a second request;
    in response to receiving the second request:
        identifying the second subset;
        identifying a second plurality of values based on a profile of the fifth entity, wherein each value in the second plurality of values corresponds to a different attribute in the second subset;
        determining that a third attribute in the second subset is associated with the editable indicator;
        determining that a fourth attribute in the second subset is associated with the non-editable indicator; and
        sending, to the computing device of the fifth entity, the second plurality of values, wherein sending the second plurality of values comprises:
            causing a third value, in the second plurality of values and corresponding to the third attribute, to be presented on the computing device of the fifth entity in a third text field that is editable, and
            causing a fourth value, in the second plurality of values and corresponding to the fourth attribute, to be presented on the computing device of the fifth entity in a fourth text field that is not editable.

12. The system of claim 1, wherein the instructions, when executed by the one or more processors, further cause:
    after sending the plurality of values, receiving, from the computing device of the third entity, a second plurality of values that correspond to the plurality of predefined attributes;
    storing the second plurality of values in association with the third entity;
    sending, over a network, to a computer system of the second entity, the second plurality of values and an identity of the third entity.

13. The system of claim 1, wherein the instructions, when executed by the one or more processors, further cause:
    after sending the plurality of values, storing, for the third entity, a second plurality of values that correspond to the plurality of predefined attributes;

sending, over a network, to a computer system of the second entity, a notification that includes a data center identifier and a lead identifier that is associated with the third entity;

after sending the notification, receiving, at a first data center, from the computer system of the second entity, an entity request that includes lead identifier and the data center identifier;

determining, by the first data center, based on the lead identifier, whether the second plurality of values are available at the first data center;

in response to determining that the second plurality of values are not available at the first data center, using the lead identifier to request the second plurality of values from a second data center identified by the data center identifier.

14. The system of claim 1, wherein the instructions, when executed by the one or more processors, further cause:

after sending the plurality of values, storing, for the third entity, a second plurality of values that correspond to the plurality of predefined attributes;

sending, over a network, to a computer system of the second entity, a notification that includes a lead identifier that is associated with the third entity and a retry value;

after sending the notification, determining, at a first data center, that the notification was not delivered to the computer system of the second entity;

in response to determining that the notification was not delivered to the computer system of the second entity:
generating a modified notification by incrementing the retry value;
transmitting the modified notification to the second entity.

15. A system provided by a first entity, the system comprising:
one or more processors;
one or more storage media storing instructions which, when executed by the one or more processors, cause:
sending, to a computing device of a second entity that is different than the first entity, a plurality of predefined attributes;
receiving, from the computing device of the second entity, input that selects a subset of the plurality of predefined attributes;
receiving, from a computing device of a third entity that is different than the first entity and the second entity, a request;
in response to receiving the request:
identifying an identity of the third entity;
identifying the subset;
retrieving, from a profile of the third entity, based on the subset, a plurality of values, wherein each value in the plurality of values corresponds to a different attribute in the subset;
storing the plurality of values in association with the third entity;
prior to sending the plurality of values to the second entity, sending, over a network, to a computer system of the second entity, a notification that an entity has submitted information that is ready for the second entity to retrieve.

16. A method performed by a first entity, the method comprising:

sending, to a computing device of a second entity that is different than the first entity, a plurality of predefined attributes;
receiving, from the computing device of the second entity, input that selects a subset of the plurality of predefined attributes;
receiving, from a computing device of a third entity that is different than the first entity and the second entity, a request;
in response to receiving the request:
identifying the subset;
identifying a plurality of values based on a profile of the third entity, wherein each value in the plurality of values corresponds to a different attribute in the subset;
determining that a first attribute in the subset is associated with an editable indicator;
determining that a second attribute in the subset is associated with a non-editable indicator; and
sending, to the computing device of the third entity, the plurality of values, wherein sending the plurality of values comprises:
causing a first value, in the plurality of values and corresponding to the first attribute, to be presented on the computing device of the third entity in a first text field that is editable, and
causing a second value, in the plurality of values and corresponding to the second attribute, to be presented on the computing device of the third entity in a second text field that is not editable;
wherein the method is performed by one or more computing devices.

17. The method of claim 16, wherein the input from the computing device of the second entity specified the editable indicator.

18. The method of claim 16, wherein:
causing the first value to be presented comprises causing to be presented, with the first value, a first visual indicator that indicates that the first value is editable;
causing the second value to be presented comprises causing to be presented, with the second value, a second visual indicator that indicates that the second value is not editable.

19. The method of claim 16, further comprising:
receiving, through the first text field, input provided by the third entity;
wherein the input comprises a third value that is different than the first value.

20. The method of claim 16, further comprising:
identifying a plurality of sources associated with a particular attribute in the plurality of predefined attributes;
wherein the plurality of sources is ordered based on a ranking;
based on the ranking, identifying a first source of the plurality of sources;
after identifying the first source, determining whether the first source contains, for the third entity, a value corresponding to the particular attribute;
in response to determining that the first source does not contain, for the third entity, a value corresponding to the particular attribute, identifying a second source of the plurality of sources based on the ranking;
after identifying the second source, determining whether the second source contains, for the third entity, a value corresponding to the particular attribute.

* * * * *